United States Patent
Lee et al.

(10) Patent No.: US 9,431,060 B2
(45) Date of Patent: Aug. 30, 2016

(54) MOBILE TERMINAL AND CONTROLLING METHOD THEREOF

(71) Applicant: LG ELECTRONICS INC., Seoul (KR)

(72) Inventors: Sunhyuk Lee, Seoul (KR); Jimyong Jung, Seoul (KR); Bumbae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 14/302,329

(22) Filed: Jun. 11, 2014

(65) Prior Publication Data

US 2015/0003803 A1  Jan. 1, 2015

(30) Foreign Application Priority Data

Jun. 28, 2013  (KR) .................. 10-2013-0075690

(51) Int. Cl.
| | |
|---|---|
| H04N 9/80 | (2006.01) |
| H04N 5/775 | (2006.01) |
| G11B 27/34 | (2006.01) |
| G11B 27/034 | (2006.01) |

(52) U.S. Cl.
CPC ............. *G11B 27/34* (2013.01); *G11B 27/034* (2013.01)

(58) Field of Classification Search
None
See application file for complete search history.

(56) References Cited

U.S. PATENT DOCUMENTS

| | | | | |
|---|---|---|---|---|
| 2009/0327856 | A1* | 12/2009 | Mouilleseaux | G11B 27/034 715/230 |
| 2012/0319971 | A1* | 12/2012 | Eguchi | G06F 3/04883 345/173 |

* cited by examiner

*Primary Examiner* — Hung Dang
(74) *Attorney, Agent, or Firm* — Lee, Hong, Degerman, Kang & Waimey PC; Jonathan Kang; Justin Lee

(57) ABSTRACT

A mobile terminal and controlling method thereof are disclosed, which facilitates a terminal to be used in further consideration of user's convenience. The present invention includes a touchscreen, a memory, and a controller outputting a play screen of a video to the touchscreen, the controller, if receiving a touch drag input to the outputted plays screen of the video, activating a memo function of saving a touch path of the touch drag input as a writing memo, the controller recording the outputted play screen of the video while the memo function is activated. Accordingly, while a mobile terminal plays a video, a user interface for enabling a user to input a memo more quickly and conveniently can be provided advantageously.

18 Claims, 16 Drawing Sheets

(a)

(b)

(c)

(d)

FIG. 8
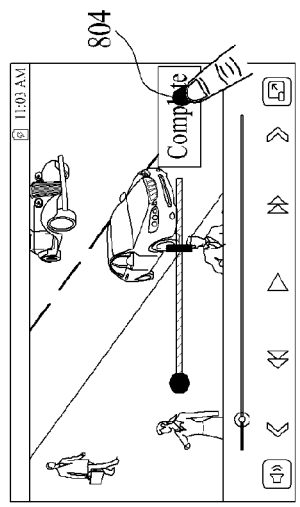
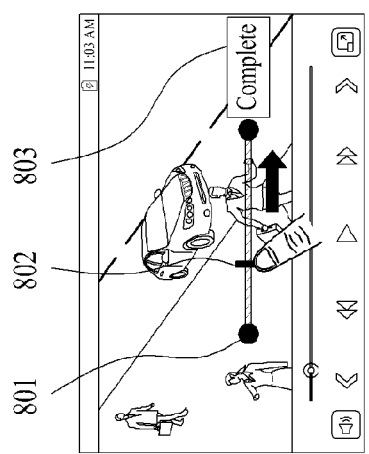
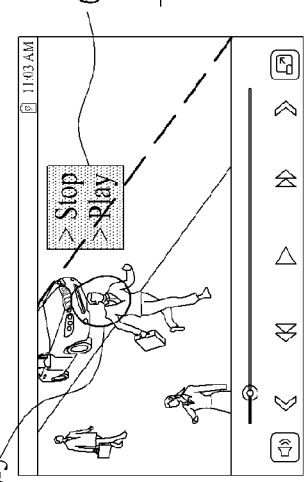

MOBILE TERMINAL AND CONTROLLING METHOD THEREOF

Pursuant to 35 U.S.C. §119(a), this application claims the benefit of earlier filing date and right of priority to Korean Application No. 10-2013-0075690, filed on Jun. 28, 2013, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As the smartphone market is expanding enormously, the number of smartphone users is increasing rapidly. Since a smartphone is equipped with various functions, it gets closer to user's daily life.

Among various functions performed by a smartphone, one of the functions most closely related to a daily life is a memo function. Hence, a method of facilitating an access to a memo function and managing the memo function efficiently is requested. Particularly, the demand for a method of inputting a memo more conveniently and quickly in an environment of playing a video and managing the memo in association with a played video efficiently is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a user can be provided with a convenient memo environment.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen, a memory, and a controller outputting a play screen of a video to the touchscreen, the controller, if receiving a touch drag input to the outputted plays screen of the video, activating a memo function of saving a touch path of the touch drag input as a writing memo, the controller recording the outputted play screen of the video while the memo function is activated.

In another aspect of the present invention, as embodied and broadly described herein, a method of controlling a mobile terminal according to the present invention may include the steps of outputting a play screen of a video to a touchscreen, if receiving a touch drag input to the outputted plays screen of the video, activating a memo function of saving a touch path of the touch drag input as a writing memo, and recording the outputted play screen of the video while the memo function is activated.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8 is a diagram for one example of a method of adjusting a memo function activated timing point according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
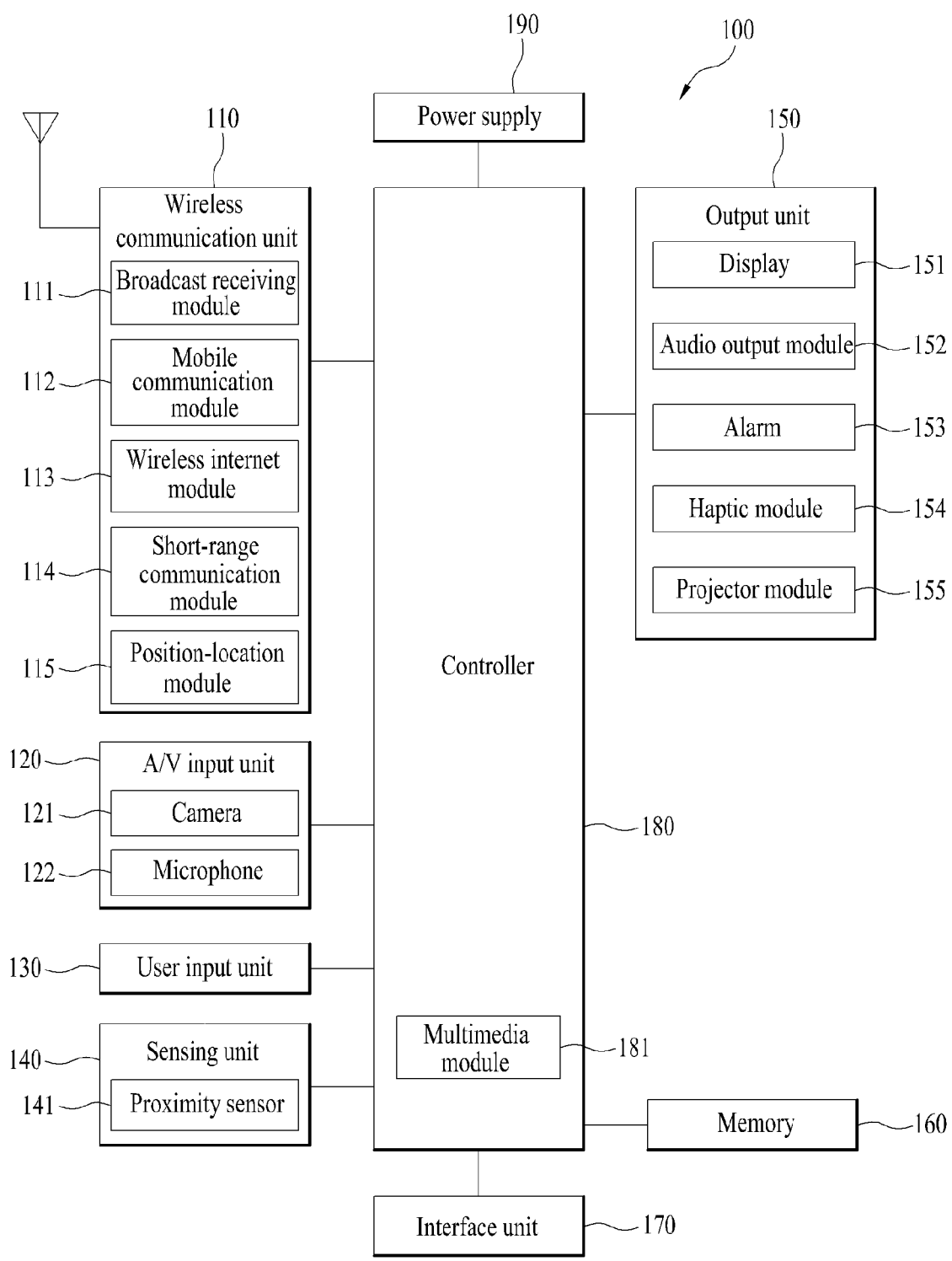
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
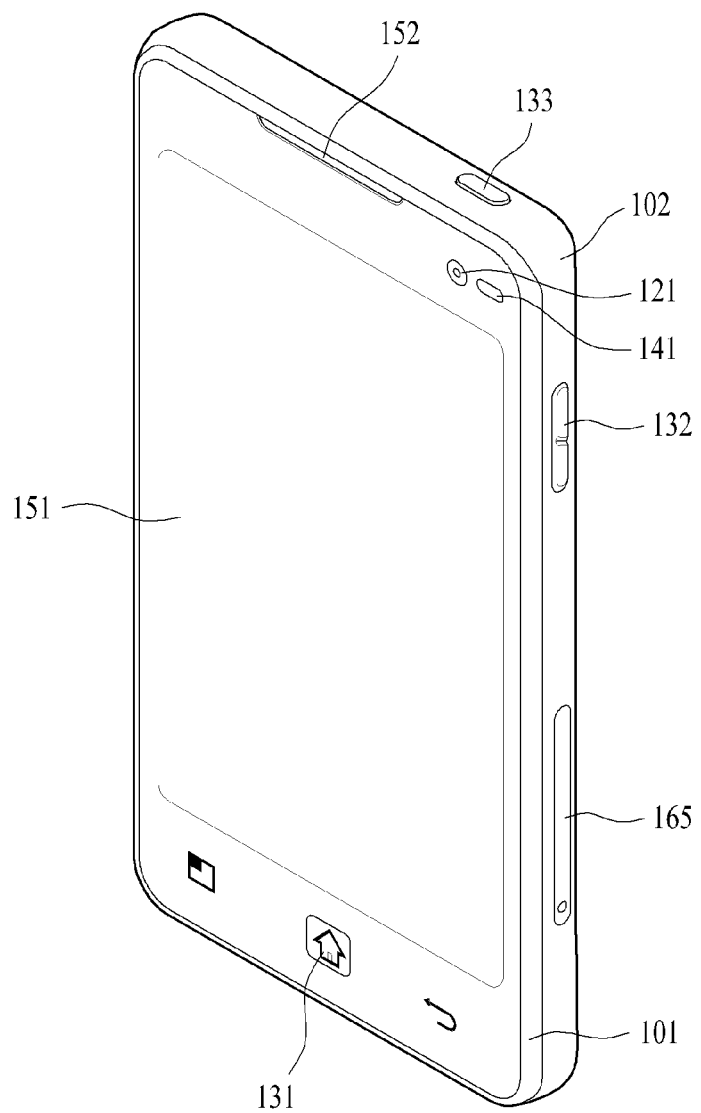
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
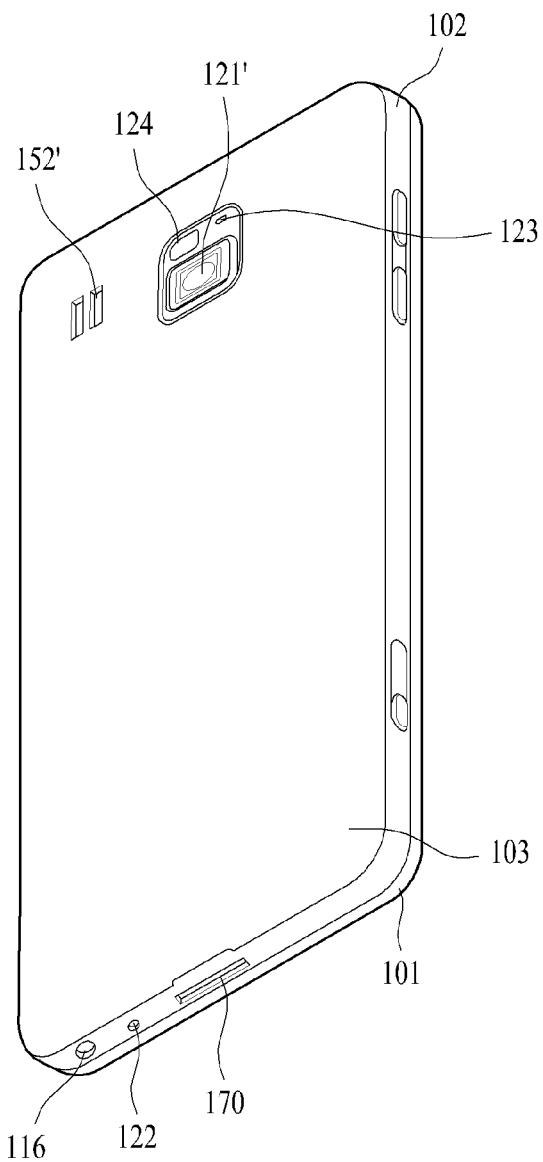
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
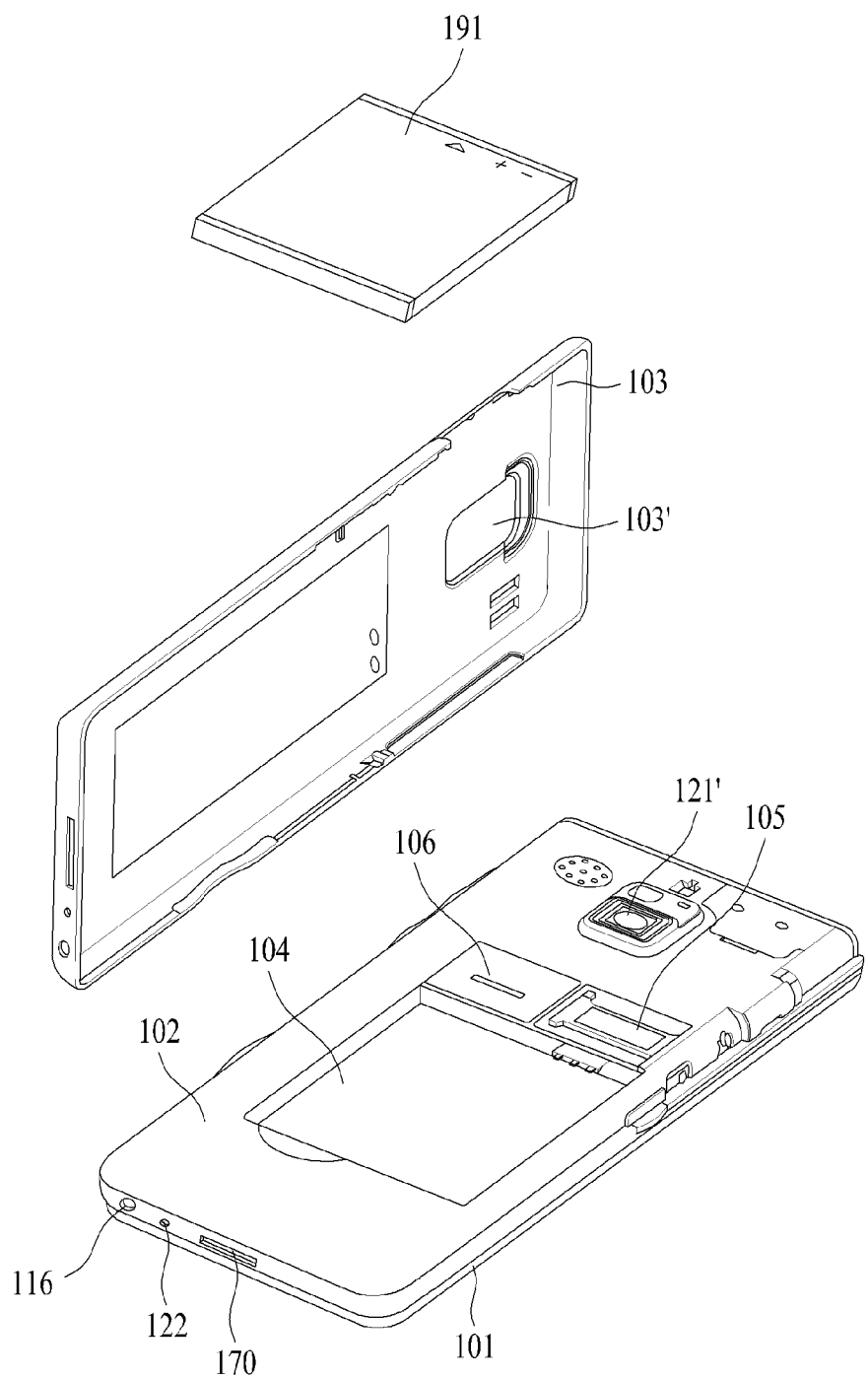
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure (not shown in the drawing). Hence, when rear case 102 and the rear cover 103 are connected to each other, the waterproof structure can seal up the gap between the rear case 102 and the rear cover 103.

Recently, a lot of the above-configured mobile terminals 100 have been released as smartphones. In particular, the smartphone tends to be equipped with rapid enhancement of hardware performance, is able to process lots of data, and handles multimedia contents of various types owing to its large-scaled display. And, video contents among the various multimedia contents types are increasingly used.

Video contents are supplied to users by being produced in the various fields such as culture, society, education and the like. Thus, the contents supplied in the various fields tend to be provided for the purpose of the information delivery as well as for the purpose of user's entertainment. In order for a user to obtain and learn the information effectively, it is necessary to modify a user interface of the mobile terminal 100.

According to one embodiment of the present invention, for the necessity mentioned in the above description, it is intended to provide a mobile terminal and controlling method thereof in an environment of playing video contents, by which a user is facilitated to take and manage a memo efficiently.

In particular, the object of the present invention is to provide an environment in which users can usefully use a mobile terminal in a manner of leaving a memo on a user-desired part of a video and editing the video rather than only watching images of a video.

It is possible for a related art to play a recorded video only. Hence, according to the related art, it is impossible to leave a memo on a desired part in general. If a user intends to watch a desired specific part, a corresponding video or image should be replayed multiple times. Therefore, according to embodiments of the present invention, various methods are provided to solve the above-mentioned problems or inconvenience of the related art.

According to one embodiment of the present invention, if a touch drag input is received in an environment in which a video is currently played, it is proposed that a memo function is activated in direct. In this case, the memo function means a function of saving a touch path of the touch drag input as a writing memo.

According to one embodiment of the present invention, while the above-mentioned memo function is active, it is proposed to record a play screen of the currently outputted video.

According to one embodiment of the present invention, further provided is a method of selecting a partial section from a whole paly section of a video easily to facilitate a video editing.

In the following description, controlling methods, which can be implemented in the above-configured mobile terminal, according to embodiments of the present invention are explained with reference to the accompanying drawings.

Figure 5:
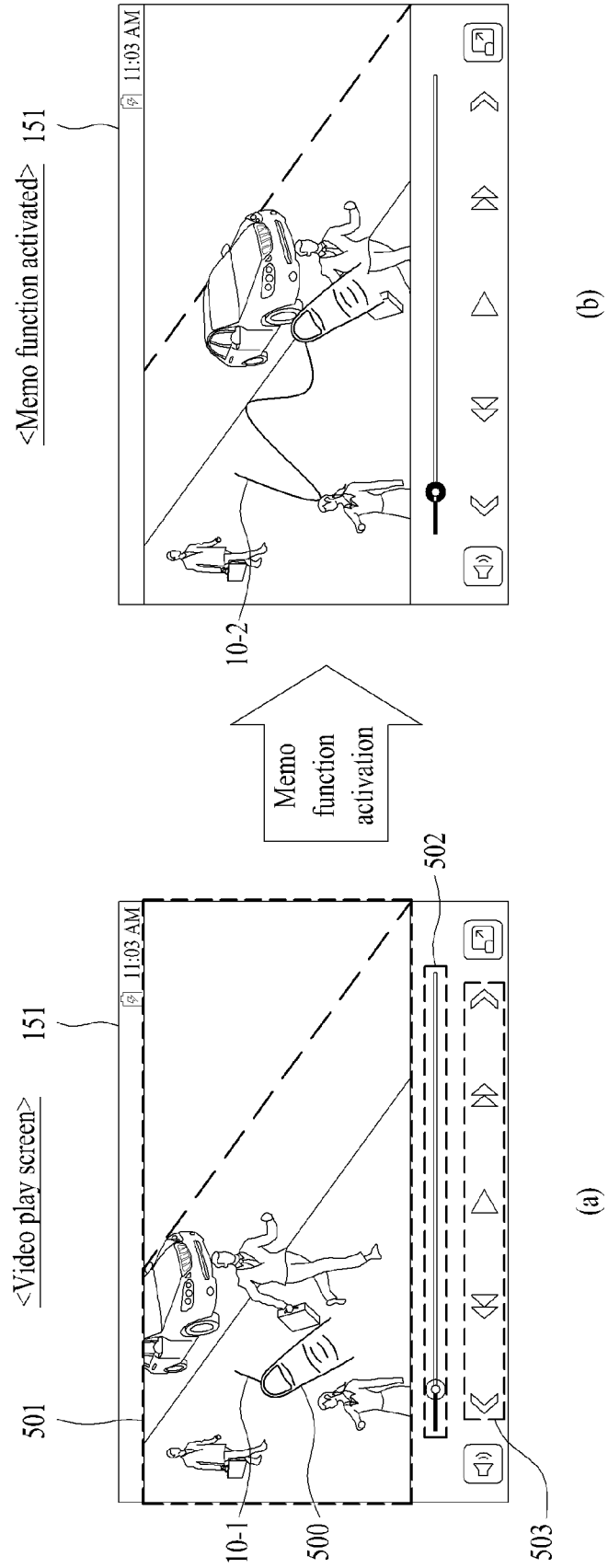
FIG. 5 is a diagram for one example of a method of activating a memo function according to one embodiment of the present invention.

FIG. 5 is a diagram for one example of a method of activating a memo function according to one embodiment of the present invention.

In the drawings provided to describe embodiments of the present invention, for clarity and convenience, an exterior shape of the mobile terminal 100 is omitted but state diagrams outputted through the touchscreen 151 may be illustrated only.

FIG. 5 (a) is a state diagram of a play screen of a video outputted through the touchscreen 151. In this play screen, a play region 501 for outputting the video, a progressive bar 502 indicating a progress status of the video, and a control region 503 for displaying an icon configured to control a play status of the video may be included. In this case, the icon included in the control region 503 may include a rewind icon, a play icon, a pause icon and/or a forward icon. Meanwhile, parts required for describing one embodiment of the present invention are described in detail only but details of the rest of the parts shall be omitted.

One object of one embodiment of the present invention is to provide an interface, by which a memo function can be easily activated in a video played environment, as shown in FIG. 5 (a), and a memo can be conveniently saved through the activated memo function.

According to one embodiment of the present invention, if the controller 180 receives a touch drag input 500 in a video played environment, it is proposed that the controller 180 activates a memo function automatically.

In this case, while a video is outputted, the memo function means the function of saving a touch path of the touch drag input to the output screen as a writing memo. And, the inputted writing memo can be saved in a manner of being linked to an image of a specific point (e.g., a point at which the writing memo starts to be inputted) of the currently outputted video. In particular, after a writing memo has been saved at a specific point of a specific video by the memo function mentioned in the foregoing description, when the corresponding point is played again, the saved writing memo can be displayed together with an output of the video. Therefore, when a writing memo is saved by the memo function, the controller 180 can save a video play time information at the corresponding writing memo inputted point together with the writing memo.

The aforementioned touch drag input may include any touch drag input applied to the touchscreen using all objects including a stylus pen, user's finger(s) and the like.

Once the memo function is activated, the controller 180 can display a touch path indicator 10-1/10-2 so that a touch path can be identifiably displayed on the output screen of the video.

According to one embodiment of the present invention, if the memo function is activated, the controller 180 can pause the currently played video.

On the other hand, according to another embodiment of the present invention, if the memo function is activated, the controller 180 can control the currently played video to keep being played.

According to a further embodiment of the present invention, if the memo function is activated, the controller 180 can receive an input of a selection for pausing or continuing to play the currently played video from a user. A method of receiving the selection input shall be described in detail with reference to FIG. 6 as follows.

Figure 6:
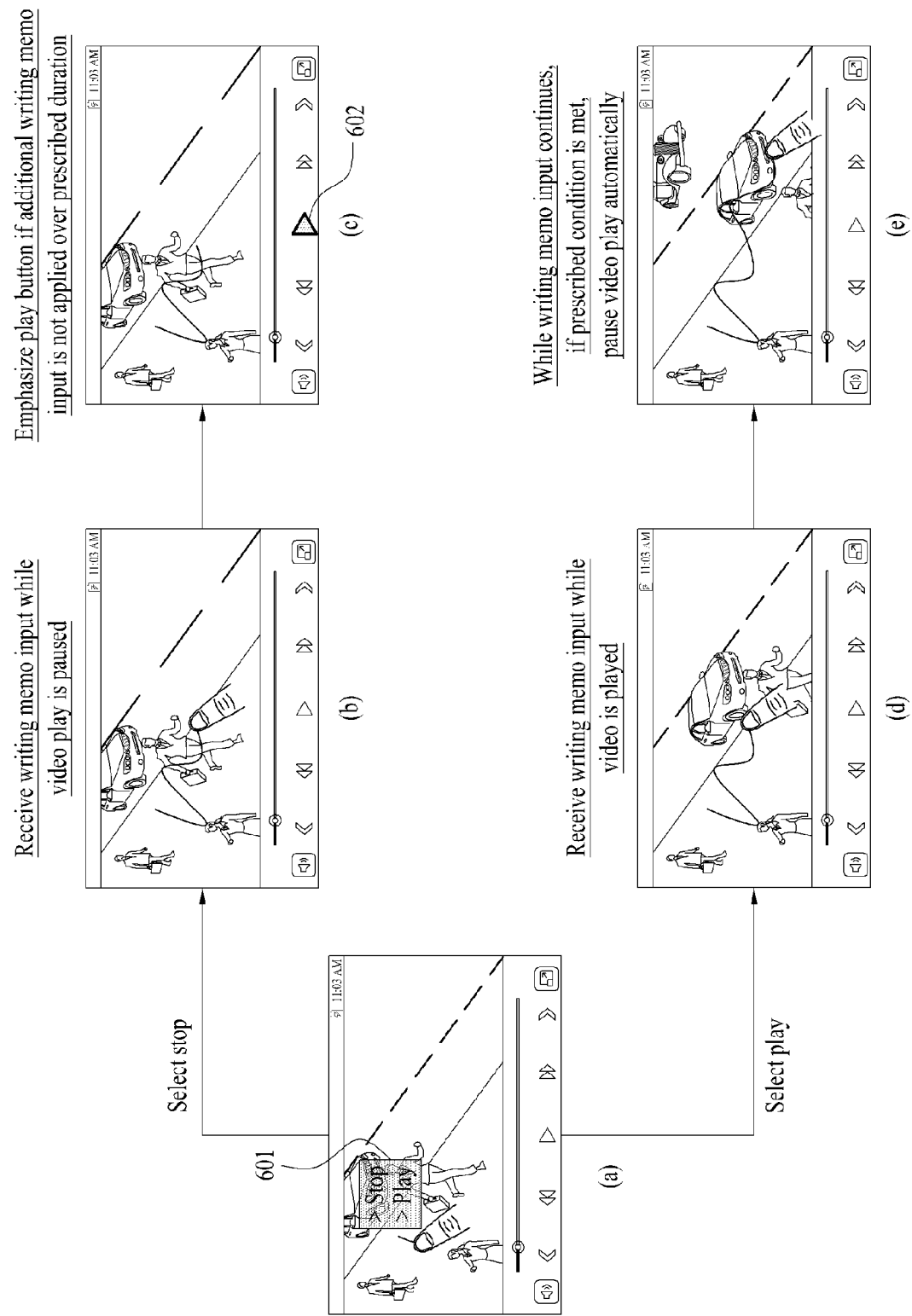
FIG. 6 is a diagram for one example of a method of selecting whether to stop playing a video in case of activating a memo function according to one embodiment of the present invention.

FIG. 6 is a diagram for one example of a method of selecting whether to stop playing a video in case of activating a memo function according to one embodiment of the present invention.

FIG. 6 (a) shows an activated state of the memo function described with reference to FIG. 5. According to one embodiment of the present invention, when the controller 180 activates a memo function, the controller 180 is proposed to output a popup window 601 for selecting whether to play a video. In this case, the popup window 601 can include an icon for selecting to stop a video and an icon for selecting to play a video.

If the stop icon is selected from the popup window 601, the controller 180 stops a play of the video and is able to receive a writing memo input through the activated memo function [FIG. 6 (b)]. In doing so, if the writing memo input is stopped and is not received for a prescribed duration, referring to FIG. 6 (c), the controller 180 can output a notification 602 that emphasizes a play button. Thereafter, if the play button is selected, the controller 180 resumes the stopped video play.

On the other hand, if the play icon is selected from the popup window 601, the controller 180 continues the video play instead of stopping the video play and is able to receive a writing memo input [FIG. 6 (d)]. Meanwhile, according to one embodiment of the present invention, if a prescribed condition is met in the course of inputting the writing memo, as shown in FIG. 6 (d), the controller 180 is proposed to pause the currently played video. The reason for this is that if the play screen of the video is changed into a screen having nothing to do with a memo, the changed screen may not be appropriate for inputting a memo. For instance, while a user is taking a video class, a screen of a chapter 1 may be suddenly switched to a screen of a chapter 2 in the course of inputting a memo of the chapter 1. If so, it is not appropriate for the memo to be inputted to the output screen of the chapter 2. And, it is necessary to maintain the output screen of the chapter 1.

Therefore, according to one embodiment of the present invention, the controller 180 detects a change of a scene in the course of inputting a writing memo, as shown in FIG. 6 (d). If the change of the scene is detected, the controller 180 can pause the currently played video. Various methods can be applied to the scheme of detecting a change of a scene. For instance, if an information on a timing point of changing a scene is previously saved in a play file of a video, it is able to determine a change point of the scene based on the information. And, it is apparent that no limitation is put on the scene change detecting scheme.

For another instance, the controller 180 detects a change of a background in a video play scene in the course of inputting a writing memo, as shown in FIG. 6 (d). If the change of the background is detected, the controller 180 can pause the currently played video.

For further instance, if a specific character exits from a video play scene in the course of inputting a writing memo, as shown in FIG. 6 (d), the controller 180 can pause the currently played video. Detailed embodiment shall be described with reference to FIG. 7 as follows.

Figure 7:
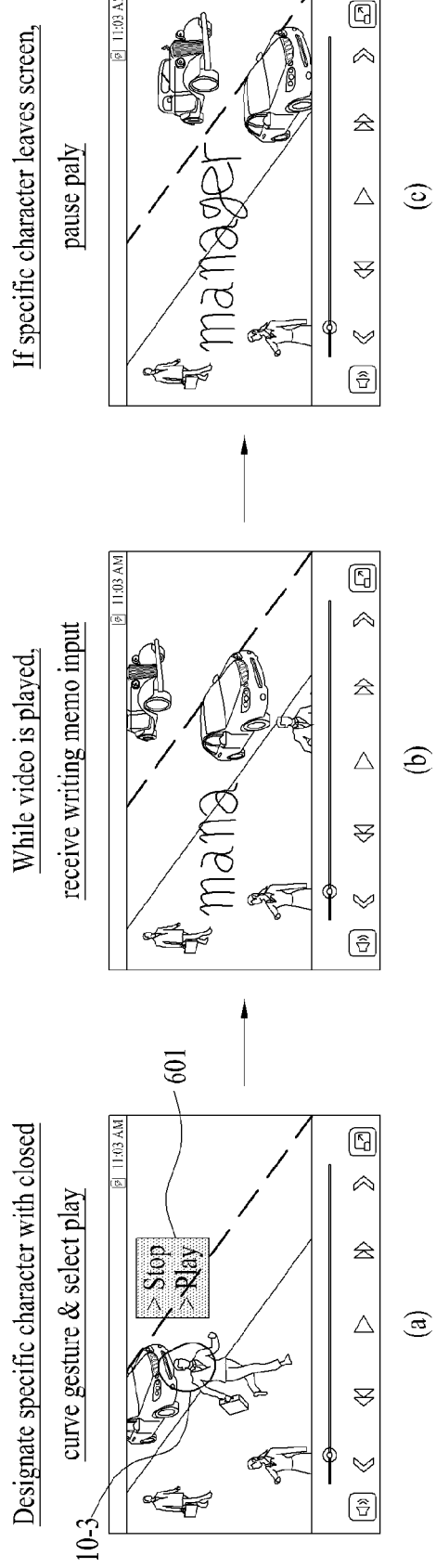
FIG. 7 is a diagram for one example of a method of detecting an exit of a specific character in a video according to one embodiment of the present invention.

FIG. 7 is a diagram for one example of a method of detecting an exit of a specific character in a video according to one embodiment of the present invention.

Recently, various methods of detecting a character by analyzing an image and/or video have been developed. A face recognition technology is one of the methods. The face recognition technology can recognize a face of a character in an image and/or video. The face recognition technology is developed to identify face identity among a plurality of persons as well as to recognize a face only. According to one embodiment of the present invention, a face recognition technology is taken as an example, by which the present invention may be non-limited.

FIG. 7 (a) shows one example of a method of designating a specific character in a video. Referring to FIG. 7 (a), 3 characters exist in a currently played video. And, at least one character can be designated by a user. In the example shown in the drawing, if the controller 180 receives a closed curve 10-3 by a touch drag input from a user, the controller 180 can designate a specific character selected by the inputted closed curve 10-3 as an interesting character. In particular, if a face of the specific character recognized by the face recognition function is located within the closed curve 10-3, the specific character is designated as the interesting character. Thus, if the specific character is designated as the interesting character, a play of the video is controlled in a manner of monitoring whether the specific character makes an exit. In FIG. 7 (a), a prescribed one of the 3 characters is selected by the closed curve 10-3.

As mentioned in the foregoing description with reference to FIG. 6, if a touch drag input is received, it is able to automatically activate a memo function. And, it is able to output a popup window 601 for selecting whether to play a video. In FIG. 7 (a), assume that a play icon is selected. Hence, while the controller 180 plays the video, as shown in FIG. 7 (b) and FIG. 7 (c), the controller 180 is able to receive an input of a writing memo from a user as well.

Meanwhile, as the video is played, assume that the aforementioned interesting character leaves or disappears from the screen. Thus, according to one embodiment of the present invention, if an interesting character leaves or disappears from a screen, such an action can be represented as making an exit. As the interesting character makes an exit, the controller 180 can detect that the face recognition function on the interesting character is not working. If the controller 180 detects that the face recognition function is not working, the controller 180 can determine that the interesting character has exited.

While the writing memo is inputted, if the controller 180 detects that the interesting character has exited, the controller 180 can automatically pause the currently played video [FIG. 7 (c)].

If the input of the writing memo is terminated, the controller 180 can automatically resume the play of the paused video. In determining whether the input of the writing memo is terminated, if there is no input of the writing memo over a prescribed duration (e.g., 3 seconds after the termination of an input of a last writing memo, etc.), the controller 180 can determine that the input of the writing memo has been terminated.

In case of receiving a command for a play of a video manually, the controller 180 can resume a play of the video as well.

According to one embodiment of the present invention, further proposed is to record a play screen of a video outputted while a memo function is activated. In particular, while a writing memo is inputted from a user, a play screen is recorded. Meanwhile, according to embodiments of the present invention, an expression 'recording' may correspond to an action of recording an output screen actually outputted through a touchscreen or an action of copying a partial data of a previously saved video. The reason for this is that the mobile terminal 100 may possibly play a video using a previously saved video data. Hence, when a partial region of a previously saved video data is copied, it may be able to bring the same effect as an action of recording an output screen actually outputted through a touchscreen.

Moreover, according to one embodiment of the present invention, if a previously saved video data exists, in performing an operation of recording a partial section of the video data, the controller 180 may save a start point information of the partial section and an end point information of the partial section only. In this case, the two informations can be named a section information. When such a section information is saved already, if the controller 180 plays the corresponding partial section only in the future, the controller 180 may play the video in a manner of paging the corresponding partial section of the previously saved video data.

Meanwhile, according to one embodiment of the present invention, while a specific character is designated, proposed is a method of precisely adjusting a start point (e.g., a memo function activated point) of a memo input.

FIG. 8 is a diagram for one example of a method of adjusting a memo function activated timing point according to one embodiment of the present invention.

Referring to FIG. 8 (a), the controller 180 is outputting a play screen of a video. Assume that the controller 180 receives an input of designating a specific character on the play screen of the video. And, assume that a play icon is selected from an outputted popup window 601. Since these steps are identical to those described with reference to FIG. 6 and FIG. 7, their details shall be omitted from the following description.

If the input shown in FIG. 8 (a) is received, the controller 180 can output a search bar 801 for searching for a section in which a corresponding specific character appears, a search object 802 indicating a prescribed point in the search bar 801 and a complete icon 803. If a specific character is designated as an interesting character, the controller 180 can activate the face recognition function mentioned in the foregoing description in identifying a section, in which the interesting character appears, from images before and after a currently outputted view. In particular, the search bar 801 is the bar outputted to search for an interesting character appearing section. And, the search object 802 can play a role as an indicator indicating a specific point of the search bar 801.

A user is able to precisely adjust a memo function activated point by adjusting a location of the search object 802. As the location of the search object 802 is adjusted, the controller 180 can control a play screen of a video to be outputted in a manner of being shifted to a corresponding point.

Hence, referring to FIG. 8 (c), if the controller 180 receives an input of shifting a location of the search object 802 and then receives an input of selecting the complete icon 803, the controller 180 is able to activate the memo function in a manner that the memo function starts from a corresponding play point. And, the controller 180 can save a writing memo inputted through the activated memo function at the activated point.

Meanwhile, according to one embodiment of the present invention, it is intended to provide an interface configured to facilitate a recording in the course of outputting a video play screen. Such an interface shall be described in detail with reference to FIG. 9 as follows.

Figure 9:
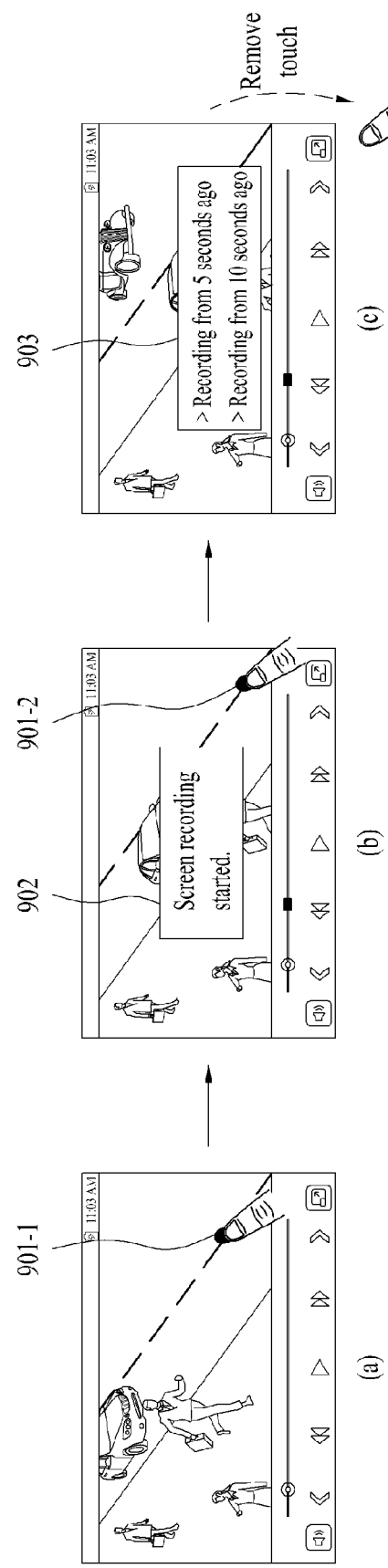
FIG. 9 is a diagram for one example of a method of executing a recording in the course of outputting a video play screen according to one embodiment of the present invention.

FIG. 9 is a diagram for one example of a method of executing a recording in the course of outputting a video play screen according to one embodiment of the present invention.

Referring to FIG. 9 (a), the controller 180 is outputting a play screen of a video through the touchscreen 151. In doing so, if the controller 180 receives a screen recording command 901-1, the controller 180 can perform a recording of the screen in response to the received command. As an example of the screen recording command 901-1, there may be a press input. In particular, while a memo function is active, a recording of a screen can be performed automatically. In FIG. 9, it can be identified as a case of performing a recording operation only without a memo.

Referring to FIG. 9 (*b*), when the controller 180 starts a recording, the controller 180 can output a notification popup window 902 indicating that the recording has started. On the other hand, according to one embodiment of the present invention, as an example of a screen recording stop command, there may be a cancellation of the aforementioned press input. Hence, the controller 180 can continue the screen recording until the press input is cancelled. In FIG. 9 (*b*), the recording is in progress. Hence, the press input 901-1 shown in FIG. 9 (*a*) continues as a press input 901-2 shown in FIG. 9 (*b*).

As mentioned in the foregoing description, according to one embodiment of the present invention, if the controller 180 receives a screen recording stop command, the controller 180 stops the recording and saves a recorded video (or recorded images). Meanwhile, according to an additional embodiment of the present invention, proposed is to further output a selection popup window 903 for starting a recording from a predetermined time before a timing point of receiving a screen recording command.

Referring to FIG. 9 (*c*), the press input 901-1/901-2 for starting/maintaining the screen recording is cancelled or removed. In response to the cancellation of the press input (or a touch input), the controller 180 can output the selection popup window 903. In this case, the selection popup window 903 may include an icon for 'recording from 5 seconds ago' and an icon for 'recording from 10 seconds ago'. If a user selects the icon for 'recording from 5 seconds ago', the controller 180 can start the recording from a timing point that is 5 seconds behind a timing point of receiving a screen recording command.

Meanwhile, in performing the recording shown in FIG. 9, when a play screen of a previously saved video is outputted, it is able to perform the above-described recording operation in a manner of copying a partial section of the previously saved video. And, it is apparent to those skilled in the art that the above-described recording operation can be performed in a manner of saving a section information on a play screen of the previously saved video only.

As another example of a method of adjusting a start point of a screen recording according to one embodiment of the present invention, there is a method of adjusting a recording section automatically by analyzing play information of a video. In this case, the paly information of the video can include a generation timing point of a sound generated from a video play, an appearance/exit timing point of a specific character, a start/end timing point of an episode, a start timing point of a conversation sentence, a background switched timing point, a scene switched timing point and the like.

For instance, if a timing point of receiving a recording command from a user is right after the occurrence of a scene switching in a played video, the controller 180 can automatically adjust a start timing point of a recording into a timing point of the scene switching occurrence.

For another instance, if a timing point of receiving a recording command from a user is right after an output of a specific background to a played video, the controller 180 can automatically adjust a start timing point of a recording into a timing point of the background output.

So far, a method of inputting a writing memo according to one embodiment of the present invention and a method of performing a recording operation according to one embodiment of the present invention are described. In the following description, a method of playing an inputted writing memo and a method of replaying recorded images are explained in detail with reference to the accompanying drawings.

Figure 10:
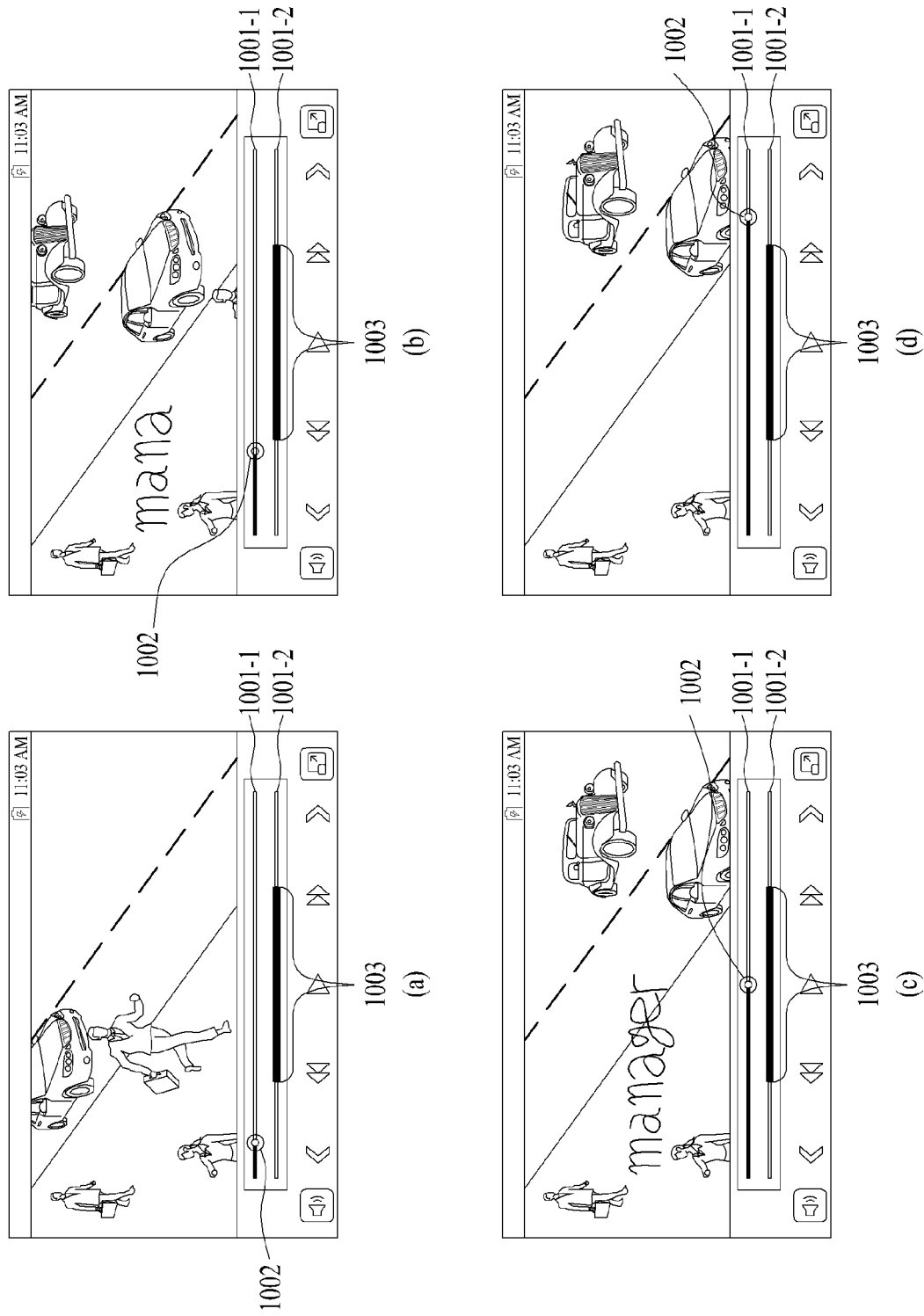
FIG. 10 is a diagram for one example of a method of displaying a writing memo inputted in the course of playing a video according to one embodiment of the present invention.

FIG. 10 is a diagram for one example of a method of displaying a writing memo inputted in the course of playing a video according to one embodiment of the present invention.

FIG. 10 (*a*) shows a play screen of a writing memo inputted video. Referring to FIG. 10 (*a*), a play progressive bar 100-1 and a play progressive bar 1001-2 are outputted to a prescribed region of the play screen. According to one embodiment of the present invention, it is proposed that the controller 180 controls a memo inputted section 1003 (hereinafter named a memo section) to be identified on each of the play progressive bar 100-1 and the play progressive bar 1001-2.

Meanwhile, FIG. 10 shows that the play progressive bar 100-1 and the play progressive bar 1001-2 are discriminated from each other, by which the present invention may be non-limited. For instance, the play progressive bar 100-1 and the play progressive bar 1001-2 can be integrated into a single bar.

The 1$^{st}$ progressive bar 100-1 indicates play sections of a whole video. And, a current location object 1002 indicating a currently outputted play location can be outputted to the 1$^{st}$ progressive bar 100-1. Hence, as a play extent of the video proceeds, the current location object 1002 can be shifted in a left-to-right direction [i.e., from a location shown in FIG. 10 (*a*) to a location shown in FIG. 10 (*b*)].

The 2$^{nd}$ progressive bar 100-2 identifiably indicates the memo section 1003 in the play sections of the whole video. Hence, a play extent of the video proceeds, if the current location object 1002 enters the memo section 1003, the controller 180 can output a writing memo inputted to the memo section 1003. In outputting the writing memo, the controller 180 may output the inputted writing memo entirely at a time. Alternatively, the controller 180 can output the writing memo sequentially in order of a touch path of the writing memo input [FIG. 10 (*b*), FIG. 10 (*c*)].

On the other hand, referring to FIG. 10 (*d*), if the video is played until a timing point at which the current location object 1002 leaves the memo section 1003, the controller 180 can stop outputting the writing memo.

Meanwhile, according to one embodiment of the present invention, proposed is a method of adjusting the start and end points of the memo section 1003 described with reference to FIG. 10. This method shall be described in detail with reference to FIG. 11 as follows.

Figure 11:
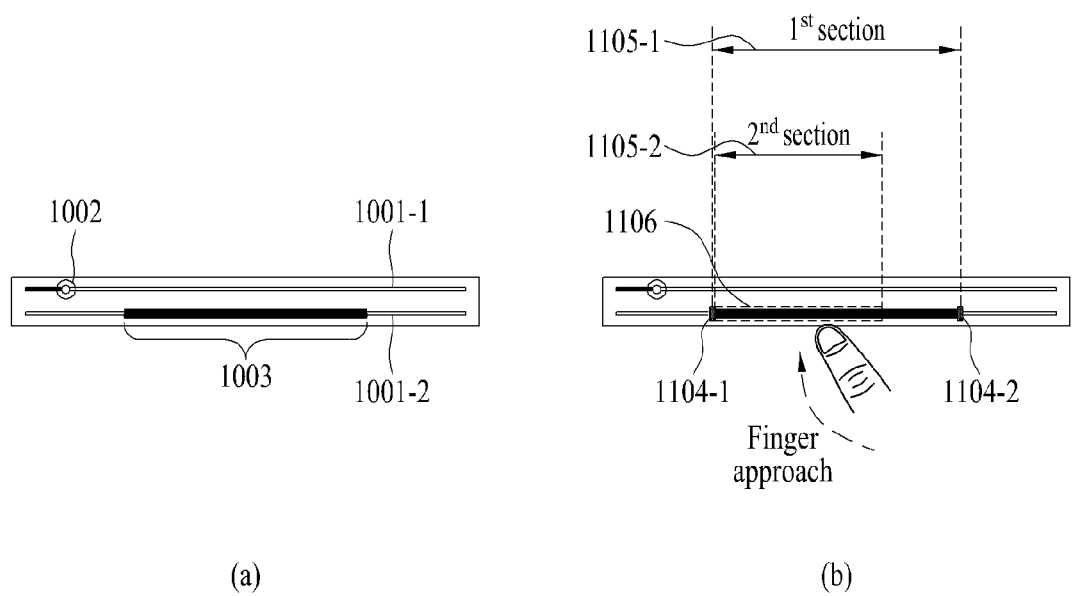
FIG. 11 is a diagram for one example of a method of adjusting a start point and an end point of a memo section 1003 according to one embodiment of the present invention.

FIG. 11 is a diagram for one example of a method of adjusting a start point and an end point of the memo section 1003 according to one embodiment of the present invention.

Referring to FIG. 11 (*a*) and FIG. 11 (*b*), according to one embodiment of the present invention, the memo section 1003 is divided into a 1$^{st}$ section 1105-1 and a 2$^{nd}$ section 1105-2. While the play progressive bar 100-1 and the play progressive bar 1001-2 are currently outputted, as shown in FIG. 11 (*a*), if the controller 180 detects a proximity of a user's finger, the controller 180 can control the 1$^{st}$ section 1105-1 and a 2$^{nd}$ section 1105-2 to be outputted in a manner of being identifiable from each other.

In order to make the $1^{st}$ section 1105-1 identifiable, the controller 180 can output $1^{st}$ section indicators 1104-1 and 1104-2 to start and end points of the $1^{st}$ section 1105-1, respectively.

In order to make the $2^{nd}$ section 1105-2 identifiable, the controller 180 can output a $1^{st}$ section indicator 1106 indicating the $2^{nd}$ section 1105-2.

Hence, the user can adjust the $1^{st}$ second 1105-1 and the $2^{nd}$ section 1105-2 by adjusting the $1^{st}$ section indicators 1104-1 and 1104-2 and the $2^{nd}$ section indicator 1106.

In this case, the $1^{st}$ section is the section identical to the whole memo section 1003 described with reference to FIG. 10 and means a section in which a writing memo is outputted.

The $2^{nd}$ section 1105-2 means a section in which a writing memo is sequentially outputted. In particular, according to one embodiment of the present invention, since an output of a writing memo can be sequentially performed in order of input, the $2^{nd}$ section 1105-2 means the section until an output of a whole writing memo is completed.

According to one embodiment of the present invention described with reference to FIG. 11, proposed is to adjust both of the $1^{st}$ section 1105-1 and the $2^{nd}$ section 1105-2 mentioned in the foregoing description.

In particular, if the $1^{st}$ section 1105-1 is adjusted, the controller 180 can adjust a section in which an output of a writing memo is performed. If the $2^{nd}$ section 1105-2 is adjusted, the controller 180 can increase or decrease a speed of an operation of outputting a writing memo sequentially.

In the foregoing description, meanwhile, a method of recording a partial section of a video is described with reference to FIG. 9. In the following description, a method of playing the recorded video shall be explained in detail with reference to FIG. 12.

Figure 12:
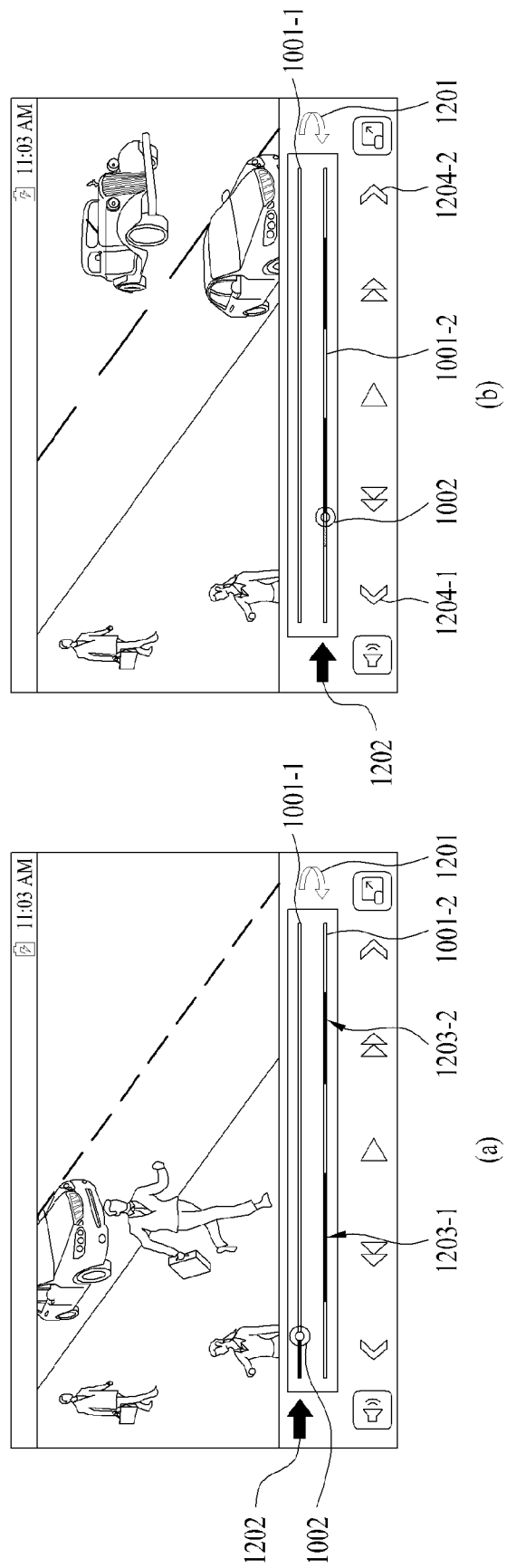
FIG. 12 is a diagram for one example of a method of playing a recorded video according to one embodiment of the present invention.

FIG. 12 is a diagram for one example of a method of playing a recorded video according to one embodiment of the present invention.

FIG. 12 (*a*) shows a play screen of a video. Referring to FIG. 12 (*a*), a current location object 1002 is moving on a $1^{st}$ progressive bar 100-1 depending on a play progress extent.

According to one embodiment of the present invention described with reference to FIG. 12, proposed is to display a recorded partial section through a $2^{nd}$ progressive bar 1001-2. As mentioned in the foregoing description with reference to FIG. 9, according to one embodiment of the present invention, while a specific video is played, a recording operation is proposed to be performed on a partial section in a whole play section. Hence, it is proposed that an indication of the partial section is performed through the $2^{nd}$ progressive bar 1001-2.

Meanwhile, according to one embodiment of the present invention, as a memo function is activated, a recording operation may be performed automatically. Alternatively, a recording is performed only while the memo function is not performed. Hence, according to one embodiment of the present invention, by discriminating the two cases from each other, each of the two cases can be identifiably displayed on the $2^{nd}$ progressive bar 1001-2. For instance, if a recording is performed by a memo function, a section is displayed in red on the $2^{nd}$ progressive bar 1001-2. If a recording is performed without a memo function, a corresponding section can be displayed in green on the $2^{nd}$ progressive bar 1001-2.

Referring to FIG. 12 (*a*), a $1^{st}$ recording section 1203-1 and a $2^{nd}$ recording section 1203-2 are displayed on the $2^{nd}$ progressive bar 1001-2. If so, a user is informed of a current play progress extent through the $1^{st}$ progressive bar 1001-1 and can be further informed of a recording section through the $2^{nd}$ progressive bar 1001-2.

Moreover, according to one embodiment of the present invention, activation/deactivation is switched between the $1^{st}$ progressive bar 1001-1 and the $2^{nd}$ progressive bar 1001-2 and a play of a video or image is controlled in accordance with the activated progressive bar.

FIG. 12 (*a*) is a diagram of a state that the $1^{st}$ progressive bar 1001-1 is activated. And, the activation of the $1^{st}$ progressive bar 1001-1 can be indicated using an activation indicator 1202. In particular, since the activation indicator 1202 indicates the $1^{st}$ progressive bar 1001-1, the state diagram shown in FIG. 12 (*a*) can indicate that the $1^{st}$ progressive bar 1001-1 has been activated.

If the $1^{st}$ progressive bar 1001-1 is activated, the controller 180 can play a video in the same manner of a general case.

FIG. 12 (*b*) is a diagram of a state that then $2^{nd}$ progressive bar 1001-2 is activated. Referring to FIG. 12 (*b*), the activation indicator 1202 indicates the $2^{nd}$ progressive bar 1001-2.

In this case, the controller 180 plays recording sections only instead of playing a whole video by skipping a region that is not a recording section. In particular, referring to FIG. 12 (*b*), it can be checked that a current location object is moving on the $1^{st}$ recording section 1203-1. If the play of the $1^{st}$ recording section 1203-1 is complete, the controller 180 can start a play of the $2^{nd}$ recording section 1203-2 by skipping plays of other sections.

In particular, when a user intends to view a recording section only, the user can view a play screen of a video by activating the $2^{nd}$ progressive bar 1001-2.

Meanwhile, the activation switching between the $1^{st}$ progressive bar 1001-1 and the $2^{nd}$ progressive bar 1001-2 can be performed through a switching icon 1201. If the controller 180 receives an input of a selection of the switching icon 1201 from a user, the controller 180 can switch an activated state between the $1^{st}$ progressive bar 1001-1 and the $2^{nd}$ progressive bar 1001-2.

On the other hand, according to the examples shown in FIG. 12 (*a*) and FIG. 12 (*b*), the activation/deactivation of the progressive bar is indicated by the activation indicator 1202. Yet, it is apparent to those skilled in the art that the activation/deactivation can be identifiably indicated by dimming the deactivated progressive bar.

Moreover, according to one embodiment of the present invention, while the $2^{nd}$ progressive bar is activated, a method for the controller 180 to perform a switching between recording sections easily is proposed. A forward section shift icon 1204-1 and a backward section shift icon 1204-2 are outputted. If one of the forward section shift icon 1204-1 and the backward section shift icon 1204-2 is shifted, a play can be easily skipped between recording sections. For instance, while a video is played in the $1^{st}$ recording section 1203-1, if the backward section shift icon 1204-2 is selected, the controller 180 can play the $2^{nd}$ recording section 1203-2 in direct.

Meanwhile, a method of additionally editing a previously saved recording section according to one embodiment of the present invention is described with reference to FIG. 13 as follows.

Figure 13:
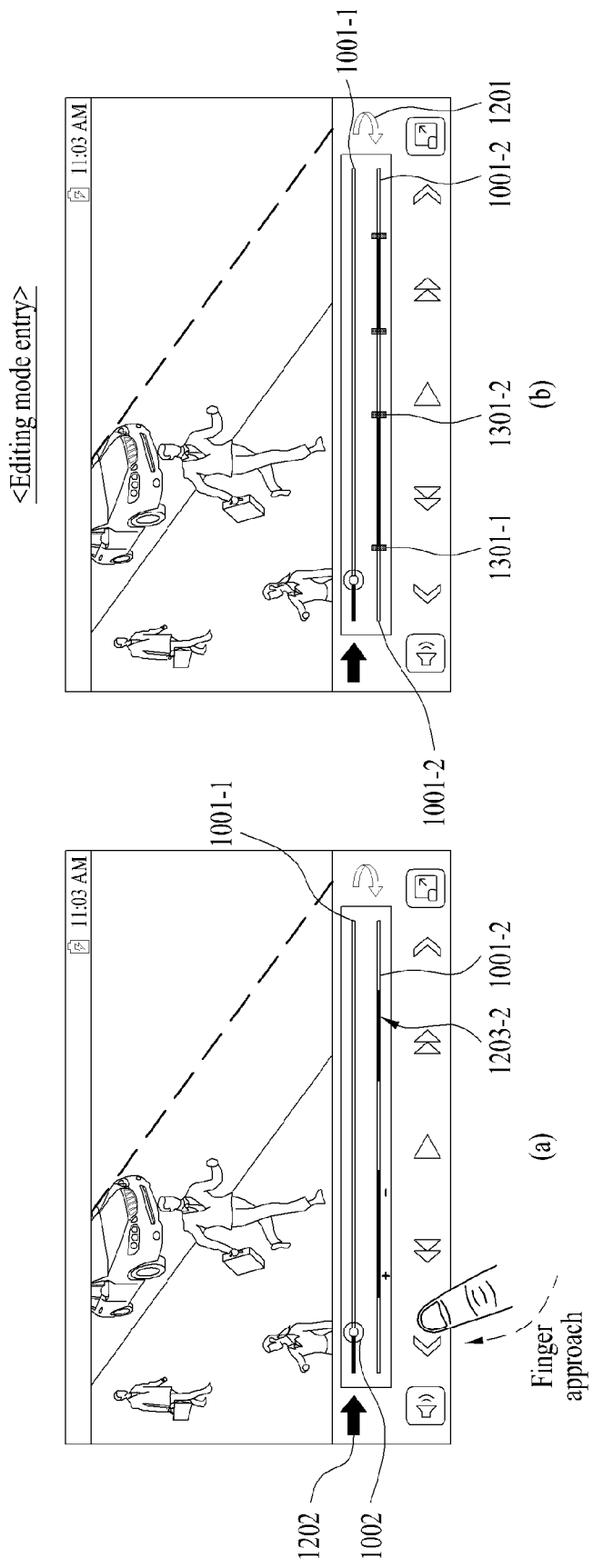
FIG. 13 is a diagram for one example of a method of editing a recording section according to one embodiment of the present invention.

FIG. 13 is a diagram for one example of a method of editing a recording section according to one embodiment of the present invention.

According to one embodiment of the present invention related to FIG. 13 (*a*), a method of setting an activated or deactivated state for a recording section is proposed. While a $1^{st}$ recording section 1203-1 and a $2^{nd}$ recording section 1203-2 exist, a user intends to activate the $2^{nd}$ recording section 1203-2 only while deactivating the $1^{st}$ recording section 1203-1.

In this case, the activation/deactivation means that an activated recording section is played only without playing a deactivated recording section in case of playing recording sections.

If a user's finger approaches the $1^{st}$ recording section 1203-1, the controller 180 detects the corresponding approach and is then able to output an icon '+' and an icon '−' under the $1^{st}$ recording section 1203-1. In this case, the icon '+' is an icon provided to activate the $1^{st}$ recording section 1203-1. And, the icon '−' is an icon provided to deactivate the $1^{st}$ recording section 1203-1.

If the controller 180 receives an input of selecting the icon '−', the controller can deactivate the $1^{st}$ recording section 1203-1.

According to one embodiment of the present invention related to FIG. 13 (*b*), proposed are controlling methods for adjusting a recording section in editing mode. If an editing mode is entered, the controller 180 can output editing indicators 1301-1 and 1301-2 to start and end parts of each recording section, respectively. If the controller 180 receives a command for shifting locations of the editing indicators, the controller 180 can adjust the corresponding recording section.

Meanwhile, the entry into the editing mode can be performed in response to a prescribed input from a user. Referring to FIG. 13 (*a*), if it is detected that a finger approaches a corresponding one of recording sections, the editing indicators are outputted so that the editing mode can be entered.

Meanwhile, according to one embodiment of the present invention, it is proposed to input a writing memo for a recording section. Such an embodiment shall be described with reference to FIG. 14 as follows.

Figure 14:
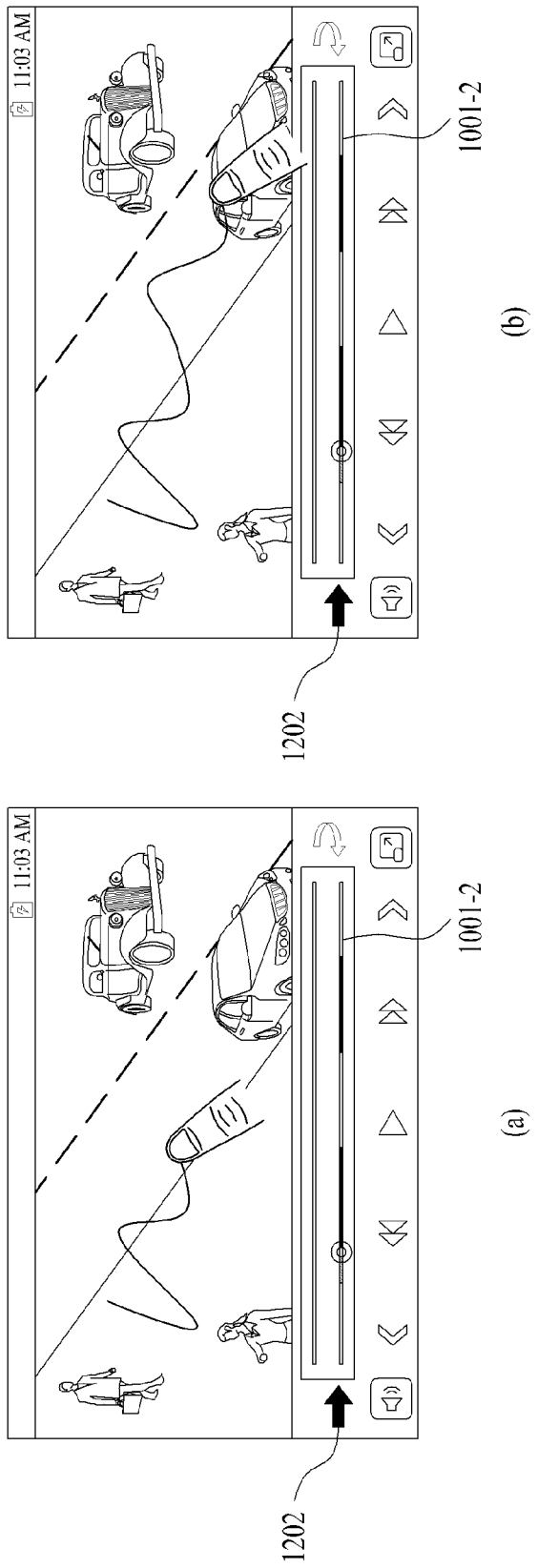
FIG. 14 is a diagram for one example of a method of inputting a writing memo for a recording section according to one embodiment of the present invention.

FIG. 14 is a diagram for one example of a method of inputting a writing memo for a recording section according to one embodiment of the present invention.

FIG. 14 (*a*) shows a screen in which a recording section is being played. Referring to FIG. 14 (*a*), a $2^{nd}$ progressive bar 1001-2 is activated. And, a $1^{st}$ recording section 1203-1 is being played.

In the state shown in FIG. 14 (*a*), if the controller 180 receives a touch path input in accordance with a touch drag input, the controller 180 can activate the memo function described with reference to FIG. 5. And, the controller 180 can additionally save a writing memo depending on the touch path. Thus, the added writing memo is left in a history. The added writing memo can be played together with a previous memo. And, the added writing memo can be selected and played.

Figure 15:
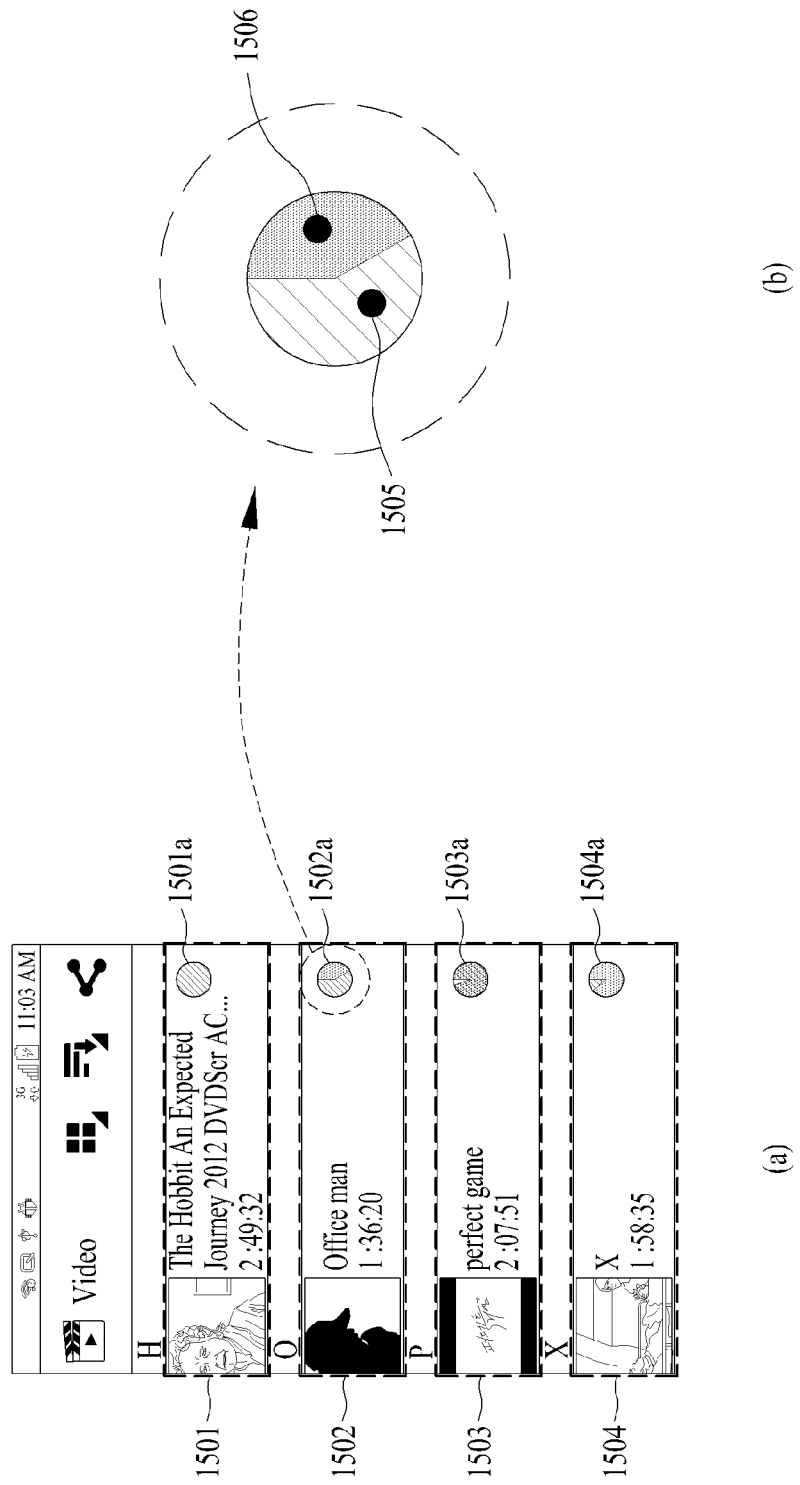
FIG. 15 is a diagram of a video play list according to one embodiment of the present invention.

FIG. 15 is a diagram of a video play list according to one embodiment of the present invention.

Referring to FIG. 15, the controller 180 displays video contents 1501 to 1504 in a video play list. And, the video content list can display edited rate indicators 1501*a* to 1504*a*. In this case, each of the edited rate indicators 1501*a* to 1504*a* means an indicator that indicates a rate of an edited section in a play time of a whole video. As mentioned in the foregoing description, the edited section may mean a section having a recording operation performed on a portion of play sections of a whole video or a section (i.e., a memo section) having a memo operation performed on a portion of play sections of a whole video. Each of the edited rate indicators 1501*a* to 1504*a* is represented as a circle diagram in FIG. 15 (*a*) and FIG. 15 (*b*). And, any indicator capable of indicating a corresponding rate can be used as each of the edited rate indicators 1501*a* to 1504*a*.

FIG. 15 (*b*) is an enlarged diagram of the editing indicator 1502*a* shown in FIG. 15 (*a*). The editing indicator can include a $1^{st}$ region 1506 indicating a rage of an edited section and a $2^{nd}$ region 1505 indicating a rate of a non-edited section. Hence, the editing indicator enables a user to recognize the rate of the edited section.

Figure 16:
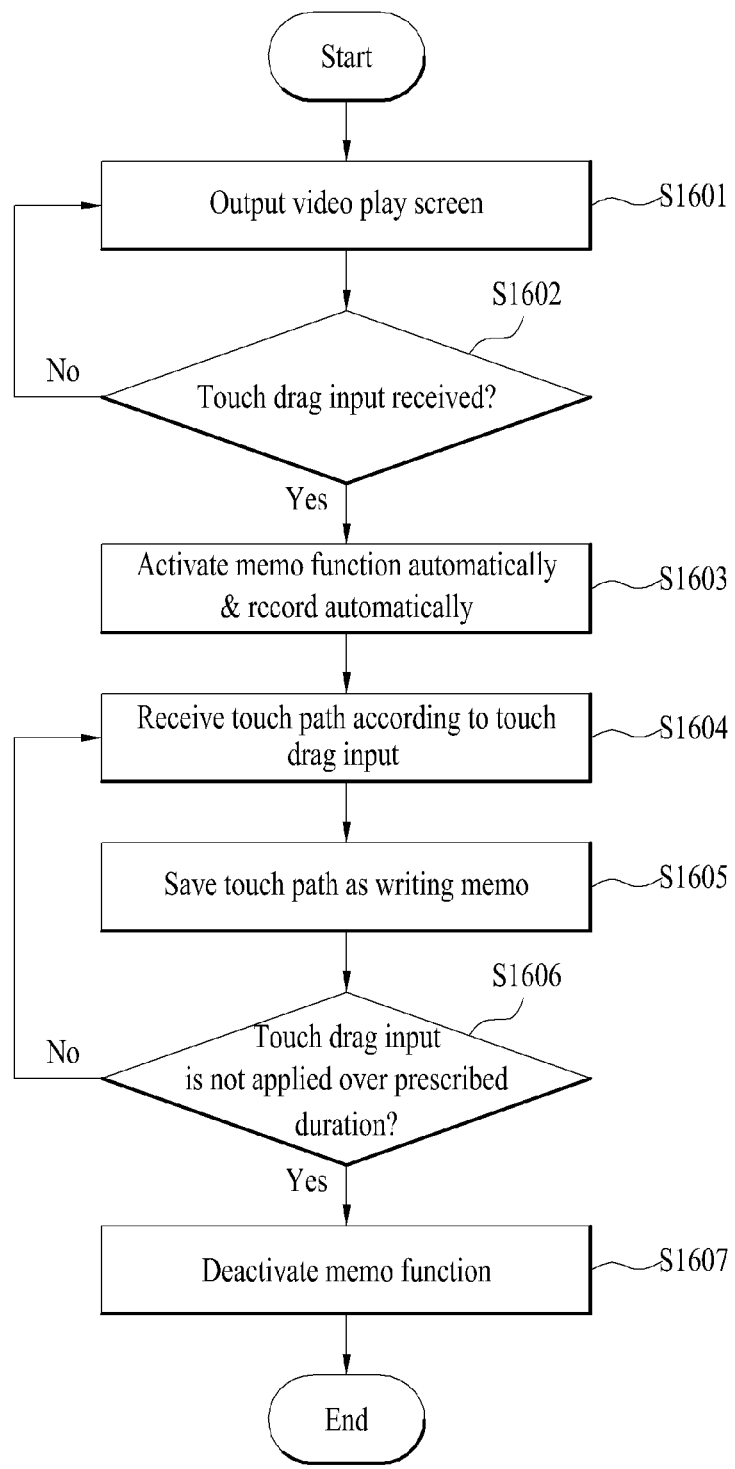
FIG. 16 is a flowchart of a memo function activation controlling method according to one embodiment of the present invention.

FIG. 16 is a flowchart of a memo function activation controlling method according to one embodiment of the present invention. According to one embodiment of the present invention described with reference to the flowchart shown in FIG. 16, it is proposed to automatically activate a memo function in response to a touch drag input.

Referring to FIG. 16, in a step S1601, the controller 180 outputs a play screen of a video. While the controller 180 outputs the play screen of the video, the controller 180 determines whether a touch drag input is receives [S1602]. If the controller 180 receives the touch drag input, the controller 180 goes to a step S1603. If the controller 180 does not the touch drag input, the controller 180 returns to the step S1601.

In the step S1603, the controller 180 activates a memo function automatically. As mentioned in the foregoing description, the memo function means a function of saving a touch path of the touch drag input as a writing memo. Moreover, in the step S1603, the controller 180 automatically performs a recording operation on the currently played video.

In a step S1604, the controller 180 can receives a touch path in accordance with the touch drag input. If the controller 180 receives the touch path, the controller 180 saves the received touch path as a writing memo [S1605]. The saved writing memo can be saved together with a recorded video.

In a step S1606, the controller 180 determines whether there is a touch drag input for prescribed duration. If there is the touch drag input, the controller 180 returns to the step S1604.

If there is no touch drag input for the prescribed duration in the step S1606, the controller 180 goes to a step S1607 and then deactivates the memo function [S1607].

Accordingly, embodiments of the present invention provide various effects and/or features.

According to at least one of embodiments of the present invention, while a play screen of a multimedia content is outputted, a convenient memo input interface can be provided.

According to at least one of embodiments of the present invention, a memo linked to an output screen of a video can be inputted. Therefore, the linked memo can be read conveniently in case of playing the video.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touchscreen configured to display information and receive touch inputs;
   a memory configured to store information; and
   a controller configured to:
      cause the touchscreen to reproduce a video;
      activate a memo function in response to receiving a touch input comprising at least one drag input while the video is reproduced;
      display a track information of the received touch input on the touchscreen;
      cause the memory to store a memo item comprising the track information and the reproduced video while the memo function is activated;
      detect a change of a scene of the reproduced video; and
      pause the reproduced video if the change of the scene occurs while the at least one drag input of the touch input is being received.

2. The mobile terminal of claim 1, wherein the controller is further configured to:
   terminate the memo function when the touch input is no longer received for a threshold length of time; and
   cause the memory to store the memo item after the memo function is terminated.

3. The mobile terminal of claim 2, wherein the controller is further configured to reproduce the stored memo item in response to a reproduction command touch input received via the touchscreen.

4. The mobile terminal of claim 1, wherein the controller is further configured to:
   detect a change of a background of the reproduced video; and
   pause the reproduced video if the change of the background occurs while the at least one drag input of the touch input is being received.

5. The mobile terminal of claim 1, wherein the controller is further configured to:
   detect a display of at least one character of the video; and
   pause the reproduced video if the detected at least one character is no longer displayed while the at least one drag input of the touch input is being received.

6. The mobile terminal of claim 5, wherein the controller is further configured to detect the display of the at least one character by performing a face recognition function of the at least one displayed character.

7. The mobile terminal of claim 1, wherein the controller is further configured to record the information displayed on the touchscreen beginning from a point prior to the activation of the memo function by a prescribed length of time.

8. The mobile terminal of claim 1, wherein the controller is further configured to cause the touchscreen to:
   display at least one progress bar of the reproduced video;
   display at least one recording section indicator on the at least one progress bar to indicate a start point or an end point of the recorded information; and
   reproduce one or more portions of the video corresponding to the at least one recording section indicator in response to an input selecting the at least one progress bar.

9. The mobile terminal of claim 8, wherein the controller is further configured to cause the touchscreen to:
   display an icon for each of the at least one recording section indicator for removing each corresponding recording section indicator from the at least one progress bar; and
   remove a recording section indicator from the at least one progress bar in response to a selection input received via the touchscreen to the corresponding icon.

10. A method of controlling a mobile terminal, the method comprising:
    reproducing a video via a touchscreen;
    receiving, via the touchscreen, a touch input comprising at least one drag input while the video is being reproduced;
    activating a memo function in response to receiving the touch input;
    display a track information of the received touch input on the touchscreen;
    storing a memo item in a memory, where the memo item comprises the track information and the reproduced video while the memo function is activated;
    detecting, by a controller of the mobile terminal, a change of a scene of the reproduced video; and
    pausing, by the controller, the reproduced video if the change of the scene occurs while the at least one drag input of the touch input is being received.

11. The method of claim 10, further comprising:
    terminating the memo function when the touch input is no longer received for a threshold length of time; and
    storing the memo item after the memo function has been terminated.

12. The method of claim 11, further comprising reproducing the stored memo item in response to a reproduction command touch input received via the touchscreen.

13. The method of claim 10, further comprising:
    detecting, via by controller, a change of a background of the reproduced video; and
    pausing, via by controller, the reproduced video if the change of the background occurs while the at least one drag input of the touch input is being received.

14. The method of claim 10, further comprising:
    detecting, via by controller, a display of at least one character of the video; and
    pausing, via by controller, the reproduced video if the detected at least one character is no longer displayed while the at least one drag input of the touch input is being received.

15. The method of claim 14, further comprising performing, by the controller, a face recognition function of the at least one displayed character to detect the display of the at least one character.

16. The method of claim 10, wherein recording the information displayed on the touchscreen is performed from a point prior to the activation of the memo function by a prescribed length of time.

17. The method of claim 10, further comprising:
    displaying at least one progress bar of the reproduced video;
    displaying at least one recording section indicator on the at least one progress bar to indicate a start point or an end point of the recorded output; and
    reproducing one or more portions of the video corresponding to the at least one recording section indicator in response to an input selecting the at least one progress bar.

18. The method of claim 17, further comprising:
displaying an icon for each of the at least one recording section indicator for removing each corresponding recording section indicator from the at least one progress bar; and
removing a recording section indicator from the at least one progress bar in response to a selection input received via the touchscreen to the corresponding icon.

* * * * *